(12) United States Patent
Wang et al.

(10) Patent No.: US 12,343,811 B2
(45) Date of Patent: Jul. 1, 2025

(54) SYSTEMS AND METHODS FOR ULTRASONIC REPAIR

(71) Applicant: Hamilton Sundstrand Corporation, Charlotte, NC (US)

(72) Inventors: Zhigang Wang, South Windsor, CT (US); Tahany I. El-Wardany, Vernon, CT (US); Andrzej Ernest Kuczek, Bristol, CT (US); David Ulrich Furrer, Marlborough, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 13 days.

(21) Appl. No.: 18/213,600

(22) Filed: Jun. 23, 2023

(65) Prior Publication Data

US 2024/0424597 A1    Dec. 26, 2024

(51) Int. Cl.
*B23K 20/10* (2006.01)
*B23K 20/26* (2006.01)

(52) U.S. Cl.
CPC .............. *B23K 20/10* (2013.01); *B23K 20/26* (2013.01)

(58) Field of Classification Search
CPC ............ B23K 20/10–106; B23K 20/26; B23K 2101/00–42
USPC .............. 228/159–161, 155, 1.1, 110.1, 119; 29/889.1
See application file for complete search history.

(56) References Cited

U.S. PATENT DOCUMENTS

| | | | | |
|---|---|---|---|---|
| 4,870,743 A * | 10/1989 | Gilmore | ................. | B29C 65/08 483/69 |
| 5,079,070 A * | 1/1992 | Chalco | ................... | H05K 3/225 428/209 |
| 6,089,438 A * | 7/2000 | Suzuki | ................. | B23K 20/106 156/580.2 |
| 6,280,125 B1 * | 8/2001 | Boisvert | ............. | B23B 31/2073 408/239 R |
| 6,932,876 B1 * | 8/2005 | Statnikov | ............... | B23K 20/10 148/558 |
| 9,446,475 B2 | 9/2016 | Norfolk et al. | | |
| 9,878,377 B2 | 1/2018 | Short et al. | | |
| 2005/0210796 A1 * | 9/2005 | Frenzl | ................... | B29C 66/474 52/470 |

(Continued)

FOREIGN PATENT DOCUMENTS

| | | | | |
|---|---|---|---|---|
| CN | 108772621 A | * | 11/2018 | ............. B23K 20/10 |
| CN | 111468816 A | * | 7/2020 | |

(Continued)

OTHER PUBLICATIONS

Extended European Search Report for EP Application No. 24182858.1, dated Dec. 9, 2024, 9 pages.

(Continued)

*Primary Examiner* — Kiley S Stoner
(74) *Attorney, Agent, or Firm* — Kinney & Lange, P.A.

(57) ABSTRACT

In accordance with at least one aspect of this disclosure, a method includes installing a welding tool into a repair tool holder, ultrasonic welding a repair sheet to a part to be repaired with the welding tool, removing the welding tool from the repair tool holder, installing a machining tool into the repair tool holder, and ultrasonic machining a portion of the repair sheet that is welded to the part to be repaired to match an a predetermined geometry of the part to be repaired with the machining tool.

13 Claims, 5 Drawing Sheets

(56) References Cited

U.S. PATENT DOCUMENTS

| | | | |
|---|---|---|---|
| 2010/0243612 A1 | 9/2010 | Leao et al. | |
| 2013/0292913 A1* | 11/2013 | Teusch | B23B 31/1178 |
| | | | 279/2.06 |
| 2014/0272248 A1* | 9/2014 | Chamberlain | C04B 35/80 |
| | | | 156/60 |
| 2015/0068663 A1* | 3/2015 | Wang | B29C 66/8322 |
| | | | 156/580.2 |
| 2020/0020661 A1* | 1/2020 | Song | B23K 20/004 |
| 2020/0086424 A1 | 3/2020 | Jones et al. | |
| 2020/0122358 A1* | 4/2020 | Reese | B25J 19/026 |
| 2020/0238414 A1 | 7/2020 | Gu et al. | |
| 2024/0217192 A1* | 7/2024 | Shen | B29C 66/1224 |

FOREIGN PATENT DOCUMENTS

| | | | | |
|---|---|---|---|---|
| CN | 112222596 A | * | 1/2021 | |
| CN | 112809159 A | * | 5/2021 | ............ B23K 20/10 |
| CN | 113245686 A | * | 8/2021 | |
| CN | 114311690 A | * | 4/2022 | ............ B23P 19/04 |
| CN | 115091022 A | * | 9/2022 | |
| CN | 115781181 A | * | 3/2023 | |
| DE | 20208872 U1 | * | 10/2002 | ............ B23K 20/10 |
| DE | 10225588 B4 | * | 3/2005 | ............ B23K 20/10 |
| DE | 102011006932 A1 | | 10/2012 | |
| DE | 102014118296 B4 | * | 4/2018 | ............ B23K 20/10 |
| DE | 102019107539 A1 | * | 10/2020 | |
| EP | 0367395 A2 | * | 5/1990 | |
| EP | 3756808 A1 | * | 12/2020 | ........... B06B 1/0662 |
| GB | 2548801 A | * | 10/2017 | ............ B23P 6/02 |
| JP | H1044242 A | | 2/1998 | |
| JP | 11314168 A | * | 11/1999 | ........... B23K 20/106 |
| JP | H11314168 A | * | 11/1999 | |
| JP | 3983609 B2 | | 9/2007 | |
| JP | 2008279692 A | * | 11/2008 | |
| RU | 1245 U1 | * | 12/1995 | |
| WO | WO-2024107232 A1 | * | 5/2024 | ............ B23P 19/06 |

OTHER PUBLICATIONS

V.K. Nadimpalli, et al., "Monitoring and repair of defects in ultrasonic additive manufacturing", from The Int'l. Journal of Advanced Manufacturing Technology, 2020, pp. 1793-1810.

* cited by examiner

SYSTEMS AND METHODS FOR ULTRASONIC REPAIR

TECHNICAL FIELD

The present disclosure relates to systems and methods for repair and more particularly to systems and methods for ultrasonic repair.

BACKGROUND

The maintenance, repair and overhaul processes of aircraft engines are dominated by a high proportion of manual work and subjective condition assessment of used parts. This leads to inefficiency due to additional, partially non-required workload and high scrap rates.

The conventional techniques have been considered satisfactory for their intended purpose. However, there is an ever present need for improved systems and methods for repair of parts which reduce an amount of manual work and scrap. This disclosure provides a solution for this need.

SUMMARY

In accordance with at least one aspect of this disclosure, a method includes installing a welding tool into a repair tool holder, ultrasonic welding a repair sheet to a part to be repaired with the welding tool, removing the welding tool from the repair tool holder, installing a machining tool into the repair tool holder, and ultrasonic machining a portion of the repair sheet that is welded to the part to be repaired to match an a predetermined geometry of the part to be repaired with the machining tool.

The method can further include installing a repair tool adapter into the repair tool, the repair tool adapter configured for both axial movement and rotational movement when installed in the repair tool holder. Installing the welding tool into the repair tool holder can include installing a welding tool tip into the repair tool adapter and installing the machining tool into the repair tool holder can include installing a machining tool tip into the repair tool adapter and installing the repair tool adapter to the repair tool holder.

In embodiments, the method can include, after installing the welding tool into the repair tool adapter, aligning the welding tool tip relative to the part to be repaired based on a predetermined offset for the welding tool tip. In embodiments, the method can include, after installing the machining tool into the repair tool adapter, aligning the machining tool tip relative to the part to be repaired based on a predetermined offset for the machining tool tip. The predetermined offset for the welding tool tip and predetermined offset for the machining tool tip can be the same or in embodiments, the predetermined offset for the welding tool tip and predetermined offset for the machining tool tip can be different. The predetermined offset for the repair tool head can be based on a type of repair tool head or another parameter of the repair tool head.

In embodiments, aligning the weld tool tip can include, using an alignment system (e.g., an interferometer or a touch probe), measuring the relative position of the weld tool tip to the part to be repaired and comparing the measured relative position to the predetermined offset for the welding tool. In embodiments, aligning the machining tool tip can include, using the alignment system, measuring the relative position of the machining tool tip to the part to be repaired and comparing the measured relative position to the predetermined offset for the machining tool. In embodiments, the method can be performed automatically, e.g., at least, installing the respective tools, removing/changing the respective tools, ultrasonic welding and ultrasonic machining.

In accordance with at least one aspect of this disclosure, repair system, can include a repair tool, a repair tool adapter operatively interfaced with the repair tool, and a plurality of differing tool heads configured to be inserted into the repair tool adapter such that the repair tool is configured for both ultrasonic welding and ultrasonic machining.

In embodiments, the system can include one or more ultrasonic transducers disposed in the repair tool configured to convert ultrasonic vibration to heat energy and/or cutting energy such that the tool is configured for both ultrasonic welding and ultrasonic machining. In embodiments, the repair tool can also include a holding portion configured to be inserted into or grasped by a motive system to move the repair tool over a part to be repaired.

In embodiments, the repair system can include the motive system and in certain embodiments, the motive system includes a gantry. In embodiments, the gantry can be part of a CNC machine.

In embodiments, the system can include an optical interferometer in optical communication with the repair tool configured to inspect and measure a position of the repair tool head relative to a part to be repaired. The system can include a controller and the controller can be configured to compare the measured relative position of the repair too head to a predetermined offset for the repair tool head. In embodiments, the controller can be configured to control the motive system to reposition the repair tool head relative to the part to be repaired based at least in part on the measurement data comparison. In embodiments, the predetermined offset for the repair tool head can be based on a type of repair tool head or another parameter of the repair tool head.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, other embodiments thereof will be described in detail herein below with reference to certain figures, wherein.

DETAILED DESCRIPTION

Figure 1:
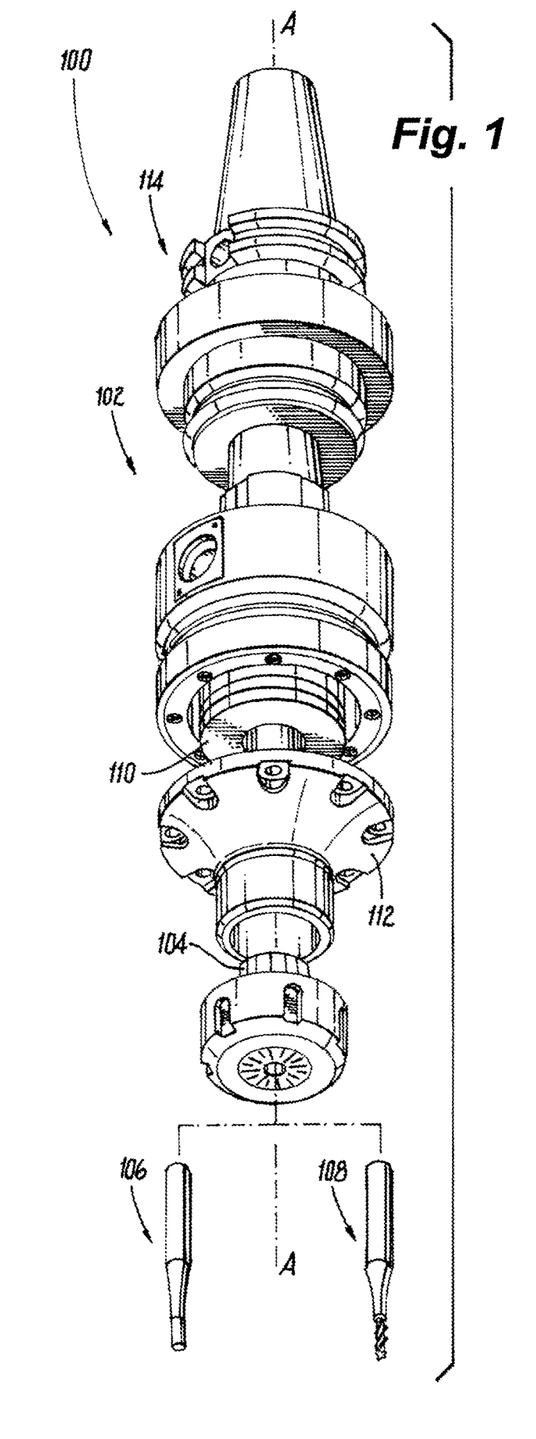
FIG. 1 is an exploded view of an embodiment of a repair tool in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-8. Certain embodiments can be used to repair parts in very small or complex/hard to reach locations where a conventional repair tool would be unable to reach, for example as discussed herein below with respect to FIGS. 6-8B. Embodiments also allow for repairs without complete disassembly of the part to be repaired.

In accordance with at least one aspect of this disclosure, repair system 100, can include a repair tool 102, a repair tool adapter 104 operatively interfaced with the repair tool 102, and a plurality of differing tool heads 106, 108 configured to be inserted into the repair tool adapter 104 such that the repair tool is configured for both ultrasonic welding and ultrasonic machining. In embodiments, the repair tool adapter 104 can include a collet configured to act similar to a chuck to accept the one or more differing repair tool heads 106, 108 within the same adapter 104, and without requiring a change of the repair tool 102 as a whole. The collet 104 is also configured to allow longitudinal, axial motion of a welding tool head 106 during ultrasonic welding, and rotation of a machining tool head 108 during ultrasonic machining. One or more ultrasonic transducers 110 can be disposed in the repair tool 102 configured to convert ultrasonic vibration to heat energy (e.g., for ultrasonic welding) and/or cutting energy (e.g., for ultrasonic machining) such that the repair tool is configured for both ultrasonic welding and ultrasonic machining. A horn 112 can be included configured to focus the ultrasonic vibration from the transducers to the tool head 106, 108.

Figure 2:
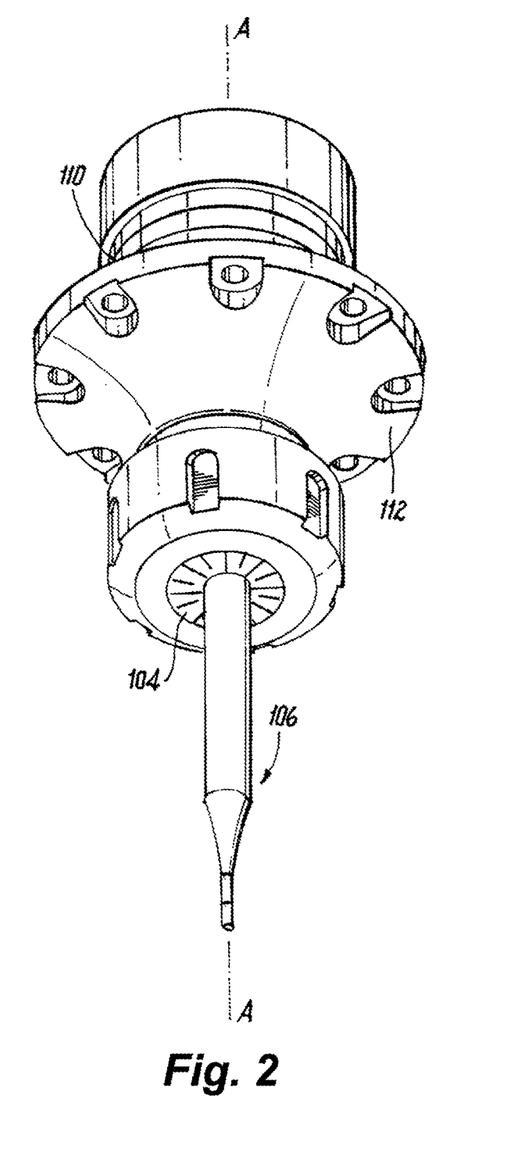
FIG. 2 is an enlarged partial view of an ultrasonic portion of the repair tool of FIG. 1.
Figure 3:
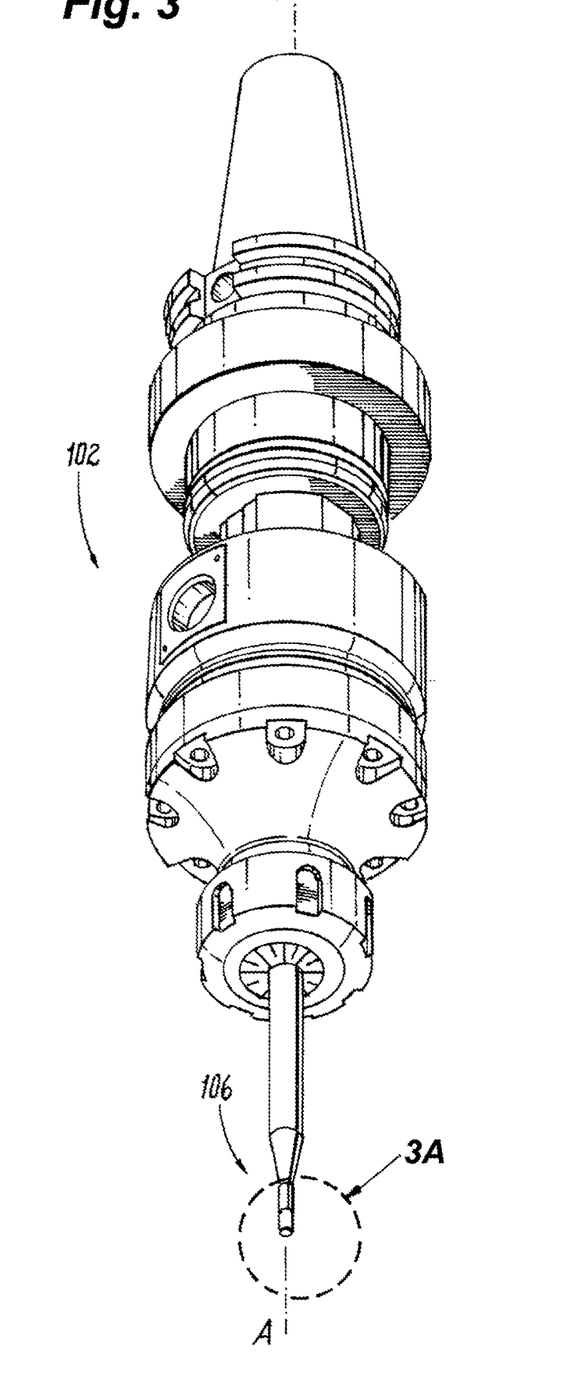
FIG. 3 is an assembled view of the repair tool of FIG. 1.
Figure 3A:
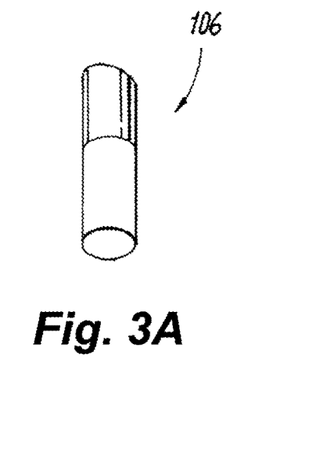
FIG. 3A is an enlarged view of an embodiment of a tool head inserted into the repair tool.
Figure 4:
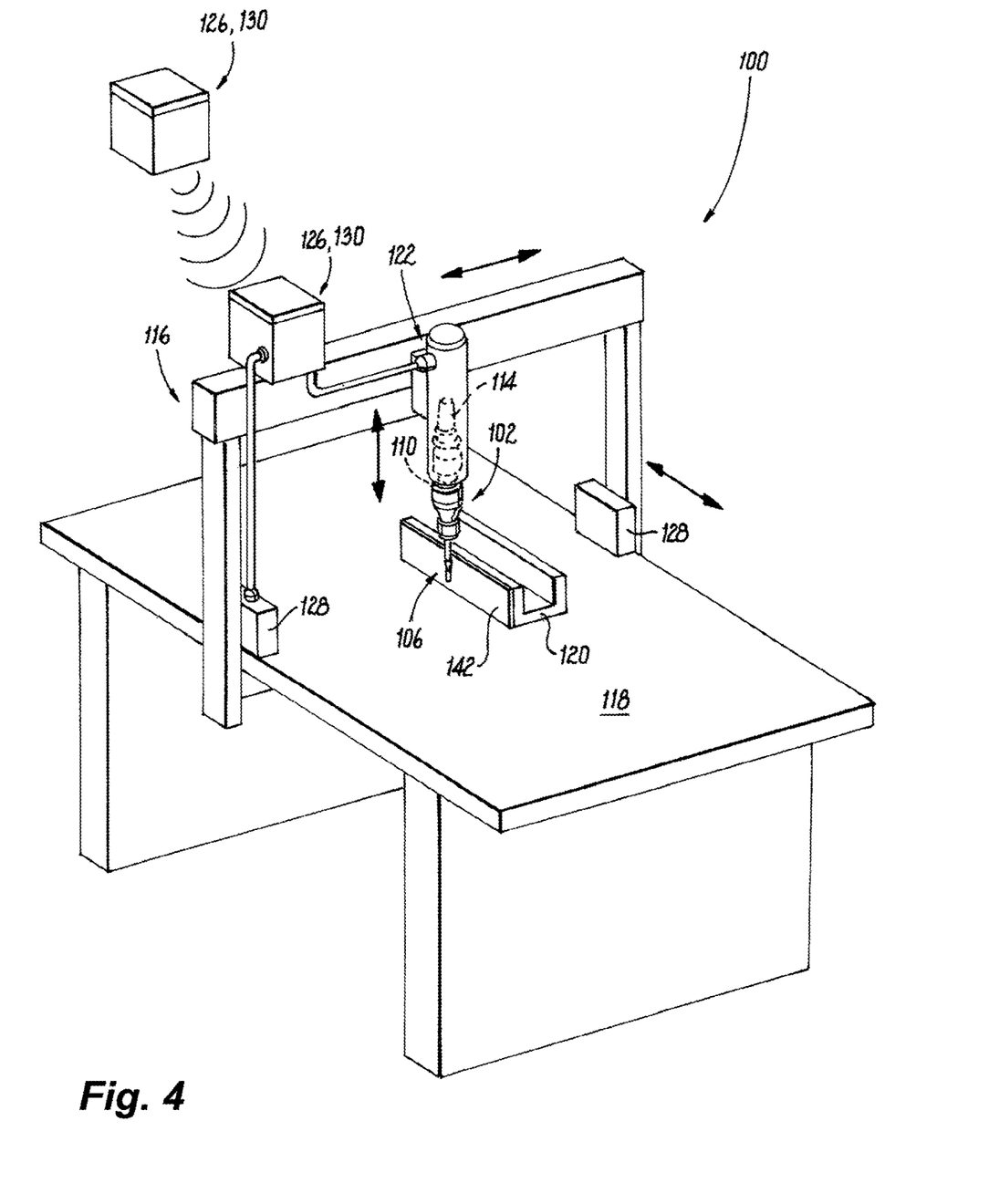
FIG. 4 is a schematic perspective view of a system in accordance with this disclosure, showing the repair tool of FIG. 1 in an embodiment of a motive system.

With reference now to FIGS. 1-4, in embodiments, the repair tool 102 can also include a holding portion 114 configured to be inserted into or grasped by a motive system 116 to move the repair tool 102 over bed 118 having a part to be repaired 120. The system 100 can include the motive system 116, and the motive system 116 can include a grabbing portion 122 configured to grab the holding portion 114 of the repair tool 102. In certain embodiments, e.g., as shown in FIG. 4, the motive system 116 includes a gantry 124. In certain embodiments, the repair system 100 can include a CNC machine, and the gantry 124 can be part of the CNC machine. The holding portion 114 of the repair tool 102 can be formed or designed to fit a general CNC machine, or can be formed or designed to fit a particular CNC machine model. In certain embodiments, the holding portion 114 of the repair tool 102 can be formed or designed to fit another type of repair system, such as an HSK solid tool holding system, a CAT tapered tool holder, or a BT tool holder, for example.

The system 100 can also include a controller 126, e.g., for controlling the motive system 116. In embodiments of a CNC motive system, the controller 126 can be or include a CNC controller configured to control the motive system 116 to move the repair tool 102 on the gantry 118 over the part to be repaired 120 and to perform the necessary repair functions, e.g., the welding and machining. In embodiments, the controller 126 can be configured to move the motive system 116 in 5 axes. The controller 126 can be programmed by a number of user inputs, such as the type and size of the part to be repaired 120, the material of the part to be repaired 120, a desired pressure and speed or frequency of the tool 106, 108 based on the material, and/or tool size, among others.

Figure 5:
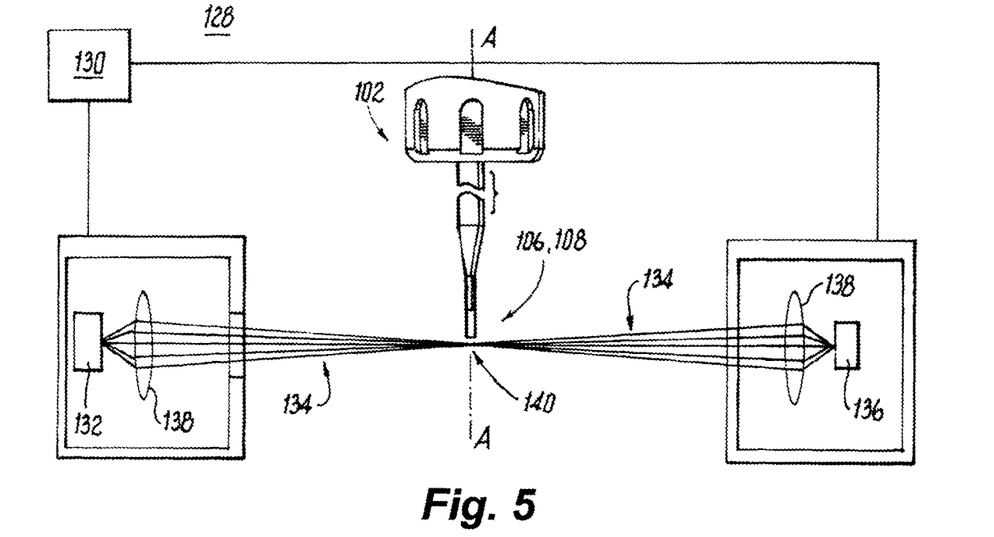
FIG. 5 is a schematic view of an embodiment of an alignment system of the system of FIG. 4.

With reference now to FIGS. 4 and 5, in embodiments, the system 100 can include an alignment system 128. In certain embodiments, e.g., as shown, the alignment system can be an optical interferometer in optical communication with the repair tool 102 configured to inspect and measure a position of the repair tool head 106, 108 relative to a part to be repaired 120. In certain embodiments, the alignment system can include a touch probe system, which can be similarly employed as the interferometer to inspect and measure the position of the repair tool head. A controller 130 (e.g., together with or separate from controller 126) can be configured to compare the measured relative position of the repair too head 106, 108 to a predetermined offset (e.g., axial and radial) for the repair tool head. The axial and radial offset refers to a distance between the tool 102 and the part to be repaired 120 in both the axial and radial directions, along the tool to the spindle interface. In embodiments, the offset can also include an angular offset, the angle of the tool head 106, 108 oriented relative to the part to be repaired 120. In embodiments, the optical interferometer system 128 can include an optical transmitter 132 (e.g., a laser transmitter) configured to transmit an optical beam 134, and an optical receiver 136 positioned opposite from the transmitter 132 configured to receive the optical beam 134. One or more optical elements 138 (e.g., lenses and/or mirrors) can be posited between the optical transmitter 132 and optical receiver 136 configured to modify the transmitted beam 134 such that a focal point 140 of the beam 134 is at the tool head 106, 108.

In embodiments, the controller 126, 130 can be configured to control the motive system 116 to reposition the repair tool 102 and/or the repair tool head 106, 108 relative to the part to be repaired 120 based at least in part on the measurement data comparison, for example, if the measured offset does not match the predetermined offset after changing the tool head 106, 108. In embodiments, the predetermined offset for the repair tool head 106, 108 can be based on a type of repair tool head or another parameter of the repair tool head. For example, the parameters can include, among others, the type of repair tool head (e.g., welding or machining), the size of the repair tool head and/or a manufacturer of the repair tool head. Each of these parameters may affect the offset from the part to be repaired as different manufacturers may have different shapes or orientations of the same tool heads, for example. Aligning the tool head each time based on these parameters allows the system 100 to accept a wide variety of tool heads including many tool types and tool heads from different suppliers. In some cases, the offset between the welding and machining tool head may be the same.

In accordance with at least one aspect of this disclosure, and as shown in FIGS. 4-8B, a method, (e.g., a method of repairing a part) can include installing a repair tool adapter (e.g., adapter 104) into a repair tool (e.g., tool 102), the repair tool adapter configured to allow both axial movement and rotational movement of a repair tool head (e.g., tool head 106, 108) when installed in the repair tool holder.

Figure 6A:
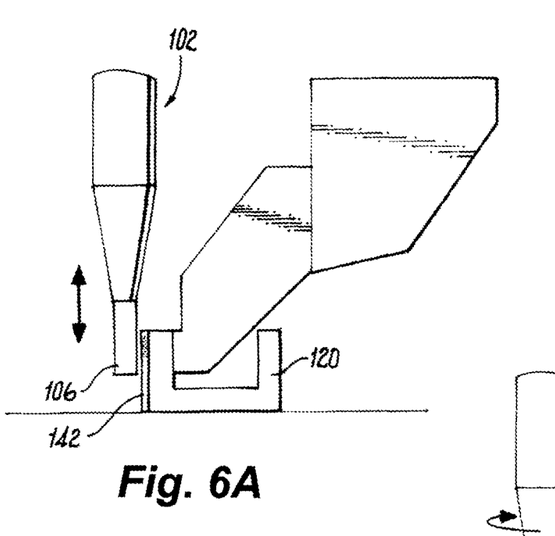
FIGS. 6A-6B show a schematic diagram of an embodiment of a method of repairing a part using repair tool of FIG. 1.
Figure 6B:
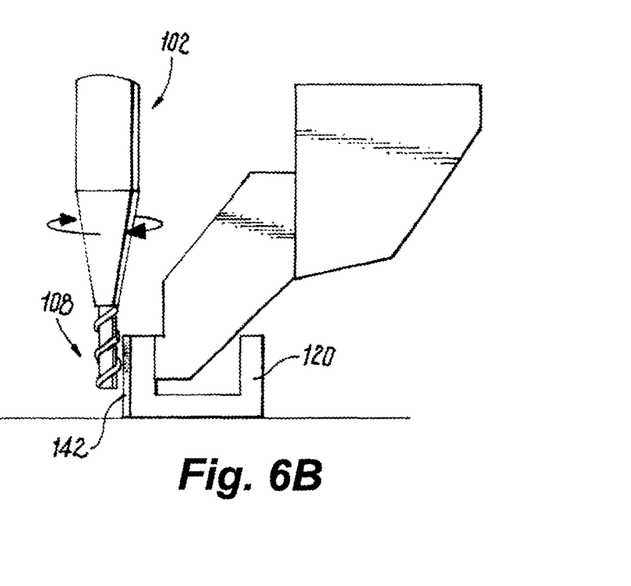
Figures 7A, 7B, 8A, 8B:
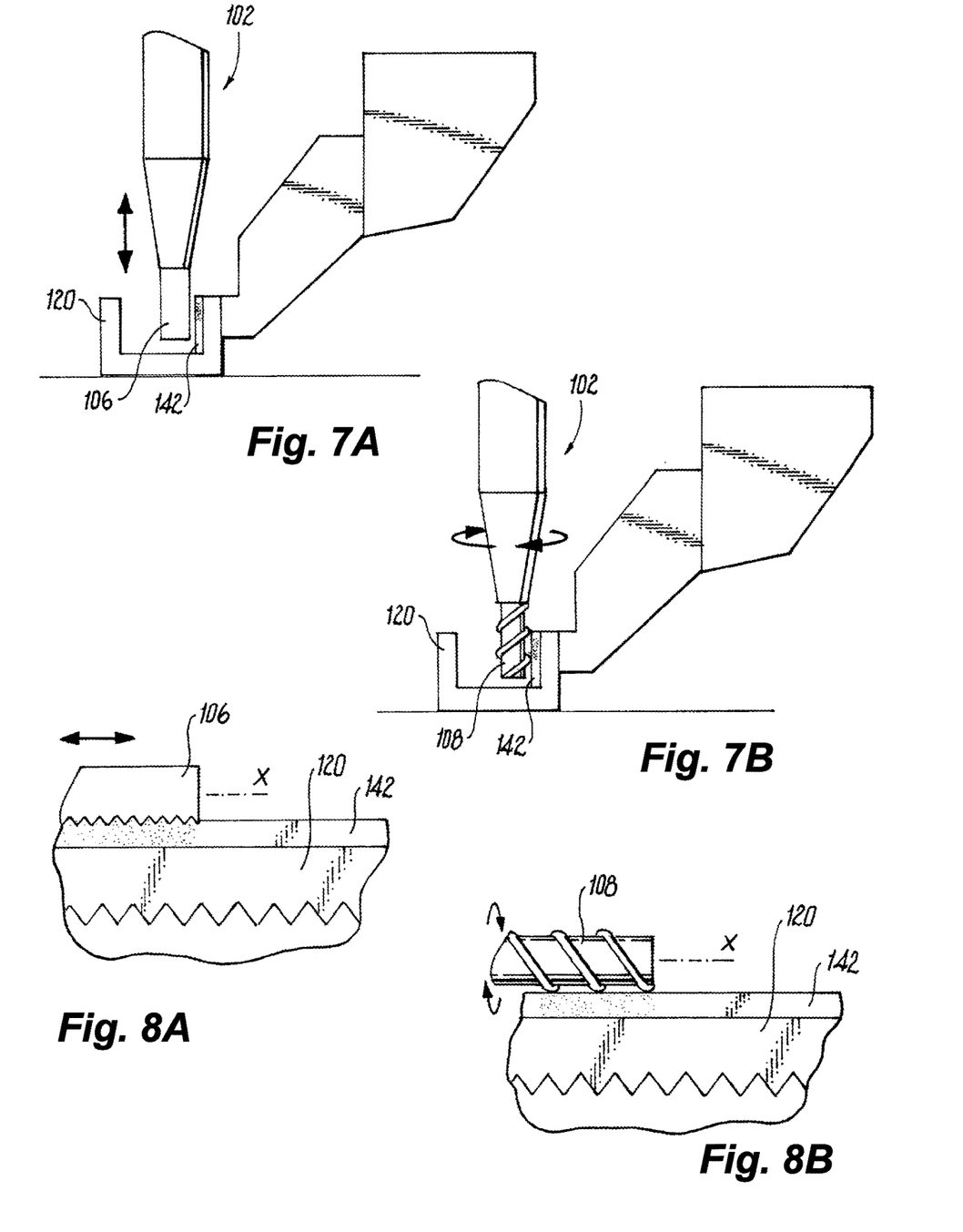
FIGS. 7A-7B show a schematic diagram of another embodiment of a method of repairing a part using repair tool of FIG. 1.
FIGS. 8A-8B show a schematic diagram of another embodiment of a method of repairing a part using repair tool of FIG. 1.

The method can further include installing a welding tool (e.g., tool head 106) into the repair tool adapter, ultrasonic welding a repair sheet 142 to a part to be repaired with the welding tool (e.g., as shown in FIGS. 6A, 7A, 8A), removing the welding tool from the repair tool adapter, installing a machining tool (e.g., tool head 108) into the repair tool adapter, and ultrasonic machining the portion of the repair sheet that is welded to the part to be repaired to match a predetermined geometry of the part to be repaired with the machining tool (e.g., as shown in 6B, 7B, 8B). In embodiments, the repair sheet 142 can include sheet metal, for example, or any other suitable material that matches or is compatible with a base material of a part to be repaired. In certain embodiments, e.g., for aero engine application, the repair sheet can be sheet metal. For example, FIGS. 6A-8B show embodiments of a method for repairing an outside engine casing or flange (FIG. 6A, 6B), an inner side engine casing or flange (FIG. 7A, 7B), and detailed tooling (FIG. 8A, 8B).

In embodiments, the method can include, after installing the welding tool into the repair tool adapter, aligning the welding tool tip relative to the part to be repaired based on a predetermined offset for the welding tool tip. Similarly, the method can include, after installing the machining tool into the repair tool adapter, aligning the machining tool tip relative to the part to be repaired based on a predetermined offset for the machining tool tip. The predetermined offset for the welding tool tip and predetermined offset for the machining tool tip can be the same or in embodiments, the predetermined offset for the welding tool tip and predetermined offset for the machining tool tip can be different based on one or more repair tool parameters (e.g., as discussed above with respect to system 100).

In embodiments, aligning the weld tool tip can include, using an interferometer (e.g., interferometer system 128), measuring the relative position of the weld tool tip to the part to be repaired and comparing the measured relative position to the predetermined offset for the welding tool. Similarly, aligning the machining tool tip can include, using the interferometer, measuring the relative position of the machining tool tip to the part to be repaired and comparing the measured relative position to the predetermined offset for the machining tool. In embodiments, the method can be performed automatically. For example, once the repair tool holder is installed into the motive system (e.g., motive system 116) and the controller (e.g., controller 126, 130) is programmed as needed for the given application, installing the respective tool heads, removing/changing the respective tool heads, ultrasonic welding, and ultrasonic machining can all be performed automatically by the system, and without further user input.

Conventionally, maintenance, repair and overhaul (MRO) processes of aircraft engines can be dominated by a high proportion of manual work and subjective condition assessment of used parts. This can lead to inefficiency due to additional, partially not required workload and high scrap rates. The current typical repair workflow for a worn/damaged metal component can include scanning and analysis, repair process by deposition, real time monitoring and machining, which are typically performed at different machines to obtain a good form accuracy and surface finish. Although these processes are well established individually, few solutions to repair parts with limited working envelope or very small clearance for tools, such as engine casing/flange or in between turbine blades, are available. Furthermore, the absence of a fully integrated and automatic repair solution represents a significant challenge for reducing adoption barriers such as repair versatility, capital investment, time to deploy, safety, and data flow management.

Embodiments of the systems and methods described herein therefore offer a solution to these concerns by providing for an automatic repair process, bringing together the ultrasonic welding and ultrasonic machining during the repair process.

Ultrasonic welding, e.g., as used herein, is a joining process including using high frequency ultrasonic vibrations (e.g., about 20-40 kHz) to convert electrical energy into heat. This process can be used to join plastics as well as most of metals, where high frequency vibrations together with pressure applied can join two materials quickly and securely, without the need of large amounts of heat as in traditional welding process. Using ultrasonic vibration as described herein can provide a number of advantages over conventional processes, including lower energy consumption and reduced process cost. The ultrasonic energy for welding can be used for thermal softening, and experimental results reveal that the ultrasonic energy required to produce an identical amount of softening is much less than the required thermal energy. Further, the magnitude of forces for metal working can be reduced to a large extent with ultrasonic vibrations. Ultrasonic welding can also eliminate subjective elements in the welding process, ensuring consistent quality and can allow for quick and easy setup, e.g., when moving from one set up to another, for example.

FIGS. 1 and 2 show an embodiment of an ultrasonic tooling system with at least three components: transducer(s) 110, a horn 112, and tool head 106, 108. The electrical energy input to the transducer is converted to mechanical vibrations along its longitudinal axis A at high frequency (e.g., about at 20-40 kHz). The excited vibration is subsequently transmitted through an energy-focusing horn to amplify the vibration amplitude and finally delivered to the tool tip. Thus, the tool, which is placed directly above the workpiece during a repair, can vibrate along its longitudinal axis with a desired amplitude.

Embodiments described in this disclosure include a method to improve the repair efficiency and attain accurate shapes by using multi-step ultrasonic process. First the ultrasonic welding process can be used to weld a repair sheet (e.g., a metal sheet in the case of aero engines) to the area to be repaired as one intermediate feature. Once the repaired areas are welded, the workpiece can then be finished with ultrasonic machining in the same setup as the ultrasonic welding too, but switching the tool head for an ultrasonic machining tooling. In order to combine both ultrasonic processes together, e.g., as described herein a common design for the repair tool is needed to leverage the capabilities of the two techniques for single feature to create the intermediate shape and to then use ultrasonic machining to finish the feature. Additionally, it is necessary to align the tooling offset accurately and efficiently between the two separate steps. While a common positioning system compatible with both ultrasonic welder and ultrasonic machining tools may be possible, if these tools are provided by different vendors, this may require a different offset between separate tools and thus dedicated positioning systems. Embodiments of the system described herein provide a common tool design for use with both ultrasonic welding and machining, as well as a common alignment tool.

Figure 3B:
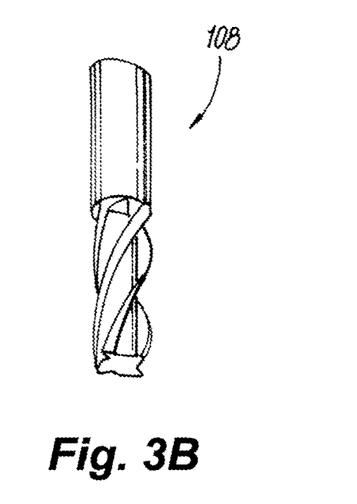
FIG. 3B is an enlarged view of an embodiment of another tool head inserted into the repair tool.

In embodiments, the repair tool can include a collet (e.g., an ER-32 collet) for holding the tool hear and a common tool holder (e.g., a CAT tapered tool holder) as shown in FIG. 1. This allows the system to be compatible with a standard CNC spindle to carry the ultrasonic tooling to perform both processes in one setup on a single CNC machine tool. Further, with this assembly design as described herein, embodiments allow for the freedom to change tool geometries to meet the design requirements of specified frequency, length and amplitude gain for specific ultrasonic welder and ultrasonic cutter, for example as shown in FIGS. 3-3B. Additionally, in certain embodiments, the respective tools and tool heads can be additively manufactured to create unique tool geometries selected tool materials. Moreover, the tool length can be measured with the on-machine tool measurement system (e.g., the interferometer system described above) as shown in FIG. 5 to get the tool diameter and length offset for each tool assembly.

In the ultrasonic welding, two types of forces are in action, a static normal force applied perpendicular to the interface between the workpieces and an oscillating force generated by oscillation of the contacting ultrasonic tooling parallel to the material interface surface as shown in FIGS. 6-8. The relative motion at the beginning of the welding cycle cleans the surfaces in contact with each other and plastically deforms asperities. The combined effect of static and oscillating forces produces deformation which promotes welding.

Welded strength is largely affected by the magnitude of the welding energy and required duration. Welding energy required for welding decreases as welding pressure increases, typically welding pressure for metals varies from about 5 to about 60 MPa (or 80-960 N for a pressurizing area of 16 mm$^2$). With the increase of welding pressure, required energy and duration can be shortened. As for the ultrasonic conditions, vibration frequency can be determined by the tooling design, for example tool length. Once the tooling design is selected, the vibration frequency is fixed, thus the main parameter to optimize is the vibration amplitude. With the increase of vibration amplitude, welding energy increases, which also shortens welding duration or fast feed rates for welding.

Benefits of multistep ultrasonic system and methods for repair as disclosed herein, include improving the process efficiency, shortening cycle time and avoiding part transfer when switching between the different processes. Embodiments allow for accurate positioning of the tooling for both processes. Additionally, the loads for both ultrasonic welding and machining are significantly smaller than traditional friction stir welding and high-speed milling, respectively, which helps to reduce part deformation during repair process to keep the geometries within tolerance.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "controller." A "circuit," "module," or "controller" can include one or more portions of one or more separate physical hardware and/or software components that can together perform the disclosed function of the "circuit," "module," or "controller", or a "circuit," "module," or "controller" can be a single self-contained unit (e.g., of hardware and/or software). Furthermore, aspects of this disclosure may take the form of a computer program product embodied in one or more computer readable medium(s) having computer readable program code embodied thereon.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A method, comprising:
    installing a welding tool into a repair tool holder;
    ultrasonic welding a repair sheet to a part to be repaired with the welding tool;
    removing the welding tool from the repair tool holder;
    installing a machining tool into the repair tool holder;
    ultrasonic machining a portion of the repair sheet that is welded to the part to be repaired to match a predetermined geometry of the part to be repaired with the machining tool;
    installing a repair tool adapter into the repair tool, the repair tool adapter configured for both axial movement and rotational movement when installed in the repair tool holder, wherein installing the welding tool into the repair tool holder includes installing a welding tool tip into the repair tool adapter and wherein installing the machining tool into the repair tool holder includes installing a machining tool tip into the repair tool adapter; and after installing the welding tool into the repair tool adapter, aligning the welding tool tip relative to the part to be repaired based on a predetermined offset for the welding tool tip.

2. The method of claim 1, further comprising, after installing the machining tool into the repair tool adapter, aligning the machining tool tip relative to the part to be repaired based on a predetermined offset for the machining tool tip.

3. The method of claim 2, wherein the predetermined offset for the welding tool tip and predetermined offset for the machining tool tip are different.

4. The method of claim 2, wherein aligning the welding tool tip further includes, using an alignment system, measuring the relative position of the welding tool tip to the part to be repaired and comparing the measured relative position to the predetermined offset for the welding tool tip.

5. The method of claim 4, wherein aligning the machining tool tip further includes, using the alignment system, measuring the relative position of the machining tool tip to the part to be repaired and comparing the measured relative position to the predetermined offset for the machining tool.

6. The method of claim 1, wherein the method is performed automatically.

7. The method of claim 4, wherein the alignment system includes:

an optical interferometer in optical communication with the repair tool and configured to measure the relative position of the machining tool tip to the part to be repaired; and a controller configured to compare the measured relative position to the predetermined offset for the machining tool.

8. The system of claim 7, wherein the controller is configured to control a motive system to reposition the repair tool tip relative to the part to be repaired based at least in part on the comparison.

9. The method of claim 8, wherein the repair tool further comprises a holding portion configured to be inserted into or grasped by the motive system.

10. The method of claim 9, wherein the motive system includes a gantry.

11. The method of claim 1, wherein ultrasonic welding comprises oscillating the welding tool parallel to an interface between the repair sheet and the part to be repaired.

12. The method of claim 1, wherein ultrasonic machining comprises rotating the machining tool with the machining tool extending parallel to an interface between the repair sheet and the part to be repaired such that a side surface of the machining tool contacts the repair sheet.

13. The method of claim 1, wherein the repair sheet is metal.

* * * * *